May 19, 1970      J. A. McGEE      3,512,515

OUTDOOR BROILER HAVING ROTARY GRILL

Filed July 9, 1968

INVENTOR.
JOHN A. McGEE
BY
Harrington A. Lackey
ATTORNEY

United States Patent Office 3,512,515
Patented May 19, 1970

3,512,515
OUTDOOR BROILER HAVING ROTARY GRILL
John A. McGee, P.O. Box 65,
Nashville, Tenn. 37202
Filed July 9, 1968, Ser. No. 743,367
Int. Cl. A47j 37/00
U.S. Cl. 126—25          1 Claim

ABSTRACT OF THE DISCLOSURE

An outdoor broiler having an open brazier or pan, supported by an undercarriage, and a grill fixed to the top of a hollow post received through a bearing in the center of the brazier for rotatable and axial movement, a non-circular drive shaft extending through a similar non-circular opening in the bottom of the post for free relative axial movement, but for unitary rotatable movement, and a motor on the undercarriage drivingly connected to the draft.

BACKGROUND OF THE INVENTION

This invention relates to an outdoor broiler, and more particularly to a portable broiler having a driven rotary grill adjustable to different heights.

Outdoor broilers, conventionally known as outdoor portable grills or outdoor barbecue stands, are well-known in the art. Furthermore, it is well-known to rotatably mount a circular grill upon an upstanding post extending through the bottom of the brazier or pan, the bottom portion of the post being engaged by a lever pivotally mounted upon the broiler frame for adjusting the height of the post and consequently the grill.

Also, the broad idea of rotatably driving a grill provided with means for independent vertical adjustment is old, as disclosed in the following U.S. patents: 3,085,-497—Statia; 3,131,685—Bergfield; 3,134,320—Meyer; 3,298,301—Lowndes.

SUMMARY OF THE INVENTION

It is therefore an object of this invention to provide an outdoor broiler which is an improvement over prior broilers.

The broiler made in accordance with this invention includes a grill mounted on a hollow post rotatably and vertically received in the bottom of the brazier or pan, and telescopingly receiving, in driving engagement, a drive shaft operatively connected to a motor fixed on the undercarriage below the shaft and the brazier. The broiler is also provided with a pivotally mounted lever for raising and lowering the hollow post and grill relative to the drive shaft and motor. In this manner, the motor is directly and drivingly connected to the bottom of the drive shaft without any intermediary power transmission mechanism. Furthermore, the motor is located well below the brazier, so that it is relatively unaffected by the heat from the brazier. The motor is fixed to the undercarriage so that it remains stationary even when the grill is raised and lowered. Thus, only the weight of the grill and its depending hollow post have to be overcome in order to adjust the elevation of the grill.

The grill may be selectively raised or lowered to different vertically adjusted stations, and the grill may also be rotatably driven in a horizontal plane over the open brazier. Both the vertical adjustment and the rotatable movement of the grill are independent of each other, so that either operation may be performed individually or simultaneously.

DESCRIPTION OF THE PREFERRED EMBODIMENT

Figure 1:
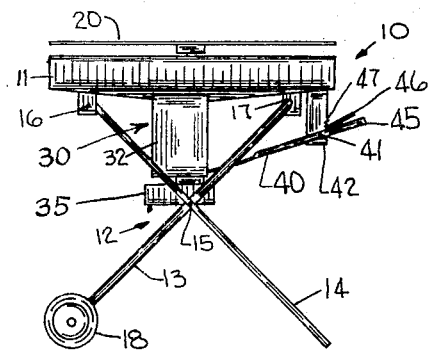
FIG. 1 is a side elevation of a broiler incorporating the invention.

Referring now to the drawings in more detail, FIG. 1 discloses an outdoor broiler 10 made in accordance with this invention, having an open-top brazier or pan 11 of circular cross-section adapted to receive fuel, such as charcoal. The brazier 11 is supported by an undercarriage 12 which may include a pair of wheel struts 13, and a pair of standing struts 14 extending in the opposite diagonal direction from the wheel struts 13 and pivotally connected to the wheel struts 13 by means of pivot pin 15. Only one of each set of struts 13 and 14 can be seen in FIG. 1. The upper ends of the standing struts 14 are pivotally connected to the bottom of the brazier 11 by the journal pin 16. The upper end of the wheel struts 13 are connected by a cross bar which is detachably held in a C-clamp 17 fixed to the bottom of the brazier 11. The struts 13 rotatably support the wheels 18, which render the undercarriage 12 portable.

A circular wire grill 20 of conventional construction is supported at its center upon the upper end 21 of an elongated hollow post 22 having a cylindrical outer surface. The post 22 extends through the central circular opening 23 in the bottom wall 24 of the brazier 11 in such a manner that the post 22 is free to move relative to the opening 23 either rotatably or axially. As additional bearing support for the post 22, the hub 25 may be fixed to the bottom wall 24 extending around the post 22 and in coaxial alignment with the circular hole 23.

Figure 3:
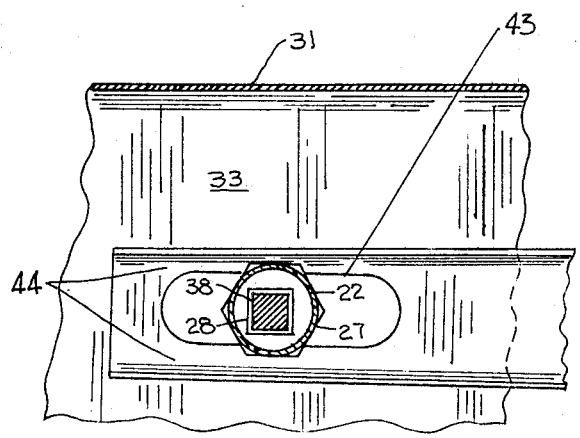
FIG. 3 is an enlarged fragmentary section taken along the line 3—3 of FIG. 2.
Figure 2:
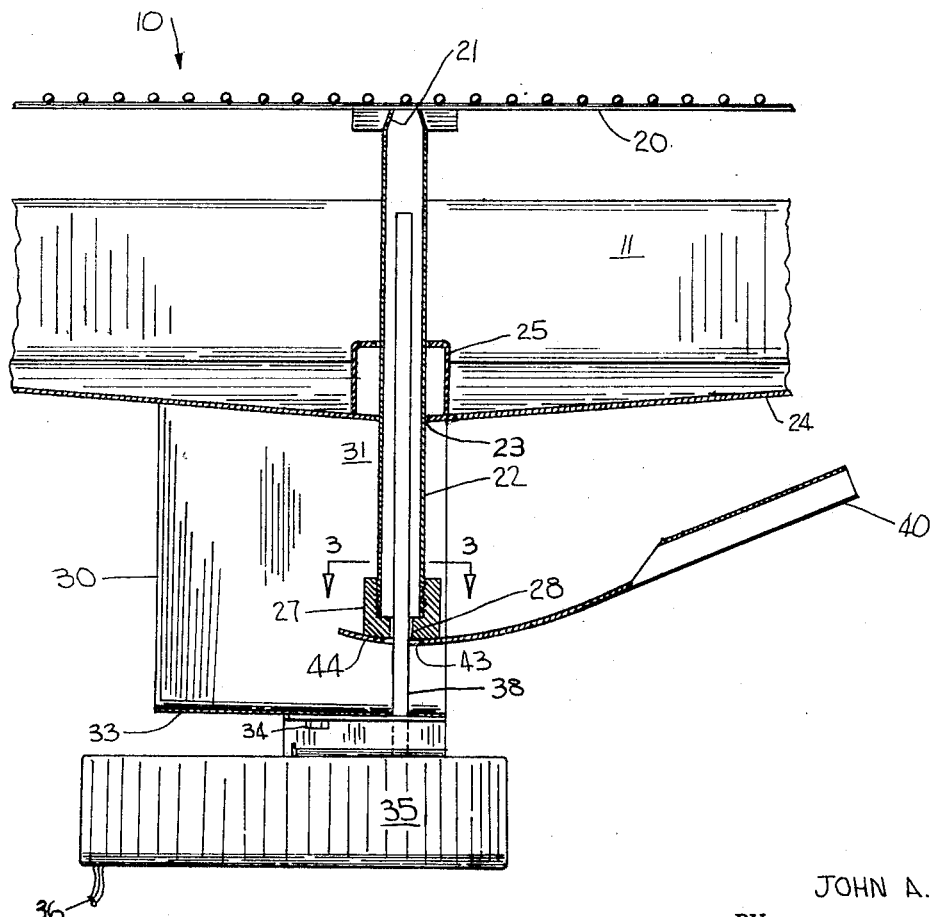
FIG. 2 is an enlarged fragmentary elevation of the upper central portion of the broiler disclosed in FIG. 1, with portions shown in section.

As disclosed in FIGS. 2 and 3, the bottom end of the post 22 is externally threaded to receive an internally threaded nut or cap 27 having a square, or any other non-circular, passage 28 coaxially aligned with the post 22.

Fixed to the bottom wall 24 is a motor bracket 30 having side walls 31 and 32 depending down on opposite sides of, and well below, the post 22 where the walls 31 and 32 are joined by a substantially horizontal bottom bracket plate 33. Fixed to the bottom of the bracket plate 33 in any convenient manner, such as by bolts 34, is a conventional electric motor 35 provided with an electrical cord 36 which may be connected to any source of electrical power, not shown. The motor 35 is drivingly connected to the bottom end of a square drive shaft 38 which extends freely through a corresponding opening in the bracket plate 33 upwardly through the square passage 28 and into the hollow interior of the post 22. The relative sizes of the square drive shaft 38 and the cooperating square passge 28 are such that the post 22 is free to move axially of the drive shaft 38, but the post 22 will rotate with the drive shaft 38 when it is driven.

A lift lever 40 is pivotally mounted by pin 41 to lever bracket 42, which in turn is fixed to the bottom wall 24, as disclosed in FIG. 1. The lever 40 is forked, or provided with an elongated open slot 43, to form tines 44 for engagement with the bottom surface of the post 22, or specifically, the bottom surface of the cap 27, as disclosed in the drawings. The other, or outer, end of the lever 40 is provided with a handle 45 having a pivoted catch 46 for selective engagement with any one of the notches 47 in the lever bracket 42, in a conventional manner.

Thus, by manually grasping the handle 45 and depressing the pivoted catch 46 to release it from its cooperating notch 47, the handle 45 may be depressed thereby elevating the tines 44 to lift the post 22 and the grill 20. Lowering of the grill 20 may be effected by the same operation, but by raising the handle 45 instead of depressing it.

The limit of elevation of the grill 20 is determined by the length of the post 22, and by the relative dimension of the cap 27, which acts as a stop engaging the bottom wall 24 when the post 22 and grill 20 are in their uppermost positions.

The upper end of the drive shaft 38 should extend at least as high as the bottom wall 24, so that the shaft 38 will still be received within the square passage 28 when the post 22 is in its uppermost position. Of course, it will be understood that the square passage 28 could be formed integrally within the bottom end of the post 22, and thus eliminate the threaded cap 27. In such event, a radially extending flange at the bottom end of the post 22 may or may not be added, since the uppermost limit of movement of the post 22 is also limited by the height to which the tines 44 may be raised. Since the tines 44 cannot rise beyond the bottom wall 24, the post 22 can be raised no further either.

It is also possible that the square passage 28 might extend entirely through the post 22, without any added function, which might facilitate manufacture. Furthermore, the passage 28 might be located over a short distance over any portion of the interior of the post 22. However, in such event, the height of the drive shaft 38 must be correspondingly increased in order to maintain constant driving engagement with the post 22.

From the above description of the broiler 10, the operation is readily apparent. After the charcoal or other fuel is deposited into the brazier 11 and lighted to generate the desired amount of heat, and the food to be broiled, such as steak, is laid upon the grill 20, the grill 20 may be adjusted to the desired height above the fire or heat within the brazier 11 by manipulating the lever handle 44, as previously described. The motor 35 may then be energized to drive the drive shaft 38, which in turn rotatably drives the post 22 and the grill 20, preferably at a slow and constant rate of speed, so that the meat is evenly broiled by rotation over the heavier and lighter concentrations of heat in the brazier 11. Such rotation also minimizes the heavy concentrations of flame in a single area precipitated by the grease dripping from the meat when it is supported in a stationary position upon the grill 20. The rotation of the grill 20 permits the dripping grease to be dissipated throughout the rotary path of the meat, as well as moving the meat out of the concentrated flame areas where the grease is dropped.

What is claimed is:
1. An outdoor broiler including a circular brazier and an undercarriage fixed to the bottom of said brazier for supporting said brazier in a substantially horizontal position, comprising:
 (a) a circular grill adapted to cover said brazier,
 (b) an elongated hollow post having a top end and an open bottom end,
 (c) journal means extending through the center of the bottom of said brazier supporting said post for rotatable movement,
 (d) the center of said grill being attached to the top end of said post for rotary movement therewith,
 (e) a non-circular passage extending axially through the bottom portion of said post,
 (f) an elongated drive shaft having a top end, a bottom end, and a non-circular cross-section similar to, and received in, said non-circular passage for relative axial movement and unitary rotary movement,
 (g) a motor bracket fixed to and depending from the central portion of the bottom of said brazier.
 (h) a motor fixed in a stationary position on said bracket, said motor being below said post and intercepting the axis of said post,
 (i) said motor having a direct drive connection to the bottom end of said drive shaft, and
 (j) a lever pivotally mounted on said undercarriage and extending beneath and engaging said bottom end of said post for axially moving said post and said grill relative to said drive shaft.

References Cited
UNITED STATES PATENTS

| | | | |
|---|---|---|---|
| 3,033,190 | 5/1962 | Atkinson | 99—443 X |
| 3,085,497 | 4/1963 | Statia | 99—340 |
| 3,131,685 | 5/1964 | Bergfield. | |
| 3,134,320 | 5/1964 | Meyer | 99—340 |
| 3,258,001 | 6/1966 | Virgil. | |
| 3,298,301 | 1/1967 | Lowndes | 99—340 |

BILLY J. WILHITE, Primary Examiner

A. O. HENDERSON, Assistant Examiner

U.S. Cl. X.R.
99—443, 450